US008825059B2

(12) United States Patent
Liu

(10) Patent No.: US 8,825,059 B2
(45) Date of Patent: Sep. 2, 2014

(54) ENTERPRISE NETWORK AND FEMTOCELL THEREOF

(76) Inventor: Jung-Tao Liu, Saratoga, CA (US)

(*) Notice: Subject to any disclaimer, the term of this patent is extended or adjusted under 35 U.S.C. 154(b) by 259 days.

(21) Appl. No.: 13/137,570

(22) Filed: Aug. 26, 2011

(65) Prior Publication Data

US 2012/0052840 A1 Mar. 1, 2012

Related U.S. Application Data

(60) Provisional application No. 61/377,928, filed on Aug. 28, 2010.

(51) Int. Cl.
*H04M 1/66* (2006.01)
*H04M 1/68* (2006.01)
*H04M 3/16* (2006.01)
*H04W 40/00* (2009.01)

(52) U.S. Cl.
USPC .......................... 455/445; 455/410; 455/411

(58) Field of Classification Search
CPC ..... H04W 12/00; H04W 12/06; H04W 12/12; H04W 12/08; H04W 88/08; H04L 63/08
USPC .......................... 455/410, 411, 445
See application file for complete search history.

(56) References Cited

U.S. PATENT DOCUMENTS

| 8,023,479 | B2* | 9/2011 | Silver et al. .................. 370/338 |
| 2009/0061873 | A1* | 3/2009 | Bao et al. ...................... 455/436 |
| 2009/0191915 | A1* | 7/2009 | Abramson et al. ............ 455/558 |
| 2009/0299788 | A1* | 12/2009 | Huber et al. ...................... 705/7 |
| 2010/0027521 | A1* | 2/2010 | Huber et al. .................. 370/338 |
| 2010/0130170 | A1* | 5/2010 | Liu et al. ....................... 455/411 |
| 2011/0021196 | A1* | 1/2011 | Grayson et al. ............ 455/435.2 |
| 2011/0158207 | A1* | 6/2011 | Alberth et al. ................ 370/338 |
| 2013/0260770 | A1* | 10/2013 | Landgren et al. ............ 455/445 |

* cited by examiner

*Primary Examiner* — Wesley Kim
(74) *Attorney, Agent, or Firm* — Birch, Stewart, Kolasch & Birch, LLP

(57) ABSTRACT

An enterprise network is disclosed. The enterprise network includes at least one site. The site includes an authorizing unit, an enterprise private branch exchange (PBX), and a plurality of femtocells. After a first femtocell of the plurality of femtocells receives a voice/data signal from an enterprise-authenticated handset and the authorizing unit authorizes the voice/data signal, the first femtocell distinguishes a destination of the voice/data signal and routes the voice/data signal to the destination.

4 Claims, 5 Drawing Sheets

ENTERPRISE NETWORK AND FEMTOCELL THEREOF

This nonprovisional application claims the benefit under 35 U.S.C. §119(e) of U.S. Provisional Application No. 61/377,928 filed on Aug. 28, 2010. The entire contents of the above application is hereby incorporated by reference.

BACKGROUND OF THE INVENTION

1. Field of the invention

The invention relates to a cellular network, in particular, to an enterprise network and a femtocell designed for the enterprise network.

2. Description of the prior art

Conventional cellular network includes multiple elements for authentication, network management, auditing, and other functions. For example, the home location register (HLR) and the visiting location register (VLR) function as database servers providing user profiles including subscriber information; the authentication center (AuC) functions as the authentication server.

Femtocell is a miniature basestation supporting near-stationary communications between handsets using cellular technologies. Of course, enterprise market is also an important market of femtocell. However, in the enterprise network, authentication and subscriber information are often tightly guarded by companies for security reasons. This is because that most companies are unwilling to open or out-source the management of such crucial information to outsiders.

Since the cellular network protocol is often highly secured and self-contained, it is hard to integrate the existing enterprise level voice/data network and femtocell. This mentality barred the 3G operators from infiltrating the enterprise market. Above all, a solution is necessary for the enterprise to keep the ownership of the secure information (e.g., authentication, subscriber information) and the operator to provide an enterprise level solution through the use of femtocells.

SUMMARY OF THE INVENTION

Therefore, a scope of the invention is to provide an enterprise network and a femtocell designed for the enterprise network to solve the above-mentioned problems.

A preferred embodiment of the invention is an enterprise network. In this embodiment, the enterprise network includes a first site. The first site includes an authorizing unit, an enterprise private branch exchange (PBX), and a plurality of femtocells. After a first femtocell of the plurality of femtocells receives a voice/data signal from a first enterprise-authenticated handset and the authorizing unit authorizes the voice/data signal, the first femtocell distinguishes a destination of the voice/data signal and routes the voice/data signal to the destination.

In an embodiment, the first site can further include a femtocell gateway for allowing and controlling a handover between two of the plurality of femtocells.

In an embodiment, if the destination of the voice/data signal is an enterprise internal extension station of the first site, the first femtocell routes the voice/data signal to the enterprise internal extension station through the enterprise PBX.

In an embodiment, if the destination of the voice/data signal is a second enterprise-authenticated handset of the first site, the first femtocell routes the voice/data signal to the second enterprise-authenticated handset through the enterprise PBX and a second femtocell corresponding to the second enterprise-authenticated handset.

In an embodiment, if the destination of the voice/data signal is out of the first site, the first femtocell routes the voice/data signal to an operator network.

In an embodiment, the enterprise network further includes a second site. The first site communicates with the second site through an internet/a public data network (PDN) or any private wired or wireless communication link such as fiber, E1, T1, etc. The first site further includes an enterprise data gateway coupled to the enterprise PBX. If the destination of the voice/data signal is the second site, the first femtocell will route the voice/data signal to the second site through the enterprise PBX, the enterprise data gateway, and the internet/PDN.

In an embodiment, the second site includes an enterprise private branch exchange (PBX) and an enterprise data gateway. When the enterprise data gateway of the second site receives the voice/data signal from the internet/PDN, the enterprise data gateway of the second site routes the voice/data signal to the enterprise PBX of the second site. If the destination of the voice/data signal is an enterprise internal extension station of the second site, the enterprise PBX of the second site will route the voice/data signal to the enterprise internal extension station of the second site.

In an embodiment, the second site further includes a plurality of femtocells. If the destination of the voice/data signal is an enterprise-authenticated handset of the second site, the enterprise PBX of the second site will route the voice/data signal to the enterprise-authenticated handset of the second site through one of the plurality of femtocells of the second site corresponding to the enterprise-authenticated handset of the second site.

In an embodiment, the first site further includes an equipment authenticating unit coupled to the first femtocell. The first enterprise-authenticated handset is authenticated by the equipment authenticating unit according to an ID of the first enterprise-authenticated handset, and the ID of the first enterprise-authenticated handset is an international mobile equipment identity (IMEI) or an international mobile subscriber identity (IMSI).

Another preferred embodiment of the invention is a femtocell applied in a site of an enterprise network. In this embodiment, the site includes an authorizing unit and an enterprise private branch exchange (PBX). The femtocell includes a communicating unit and a distinguishing unit. The communicating unit receives a voice/data signal from a first enterprise-authenticated handset and transmits the voice/data signal to the authorizing unit for authorization. After the voice/data signal is authorized by the authorizing unit, the distinguishing unit distinguishes a destination of the voice/data signal and the communicating unit routes the voice/data signal to the destination.

Compared to the prior art, the invention discloses an enterprise network and a femtocell designed for the enterprise network to outline innovative ways to integrate femtocell with the latest PBX technologies such as H.323, SIP, or other data/voice communication protocols. It provides a solution for the enterprise to keep the ownership of the secure information (e.g., authentication, subscriber information) and the operator to provide an enterprise level solution through the use of femtocells. Therefore, 3G operators can use the technologies of the invention to infiltrate the enterprise market more easily.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

The invention discloses an enterprise network and a femtocell designed for the enterprise network, so that the enterprise can keep the ownership of the secure information and the operator can provide an enterprise level solution through the use of femtocells.

Figure 1:
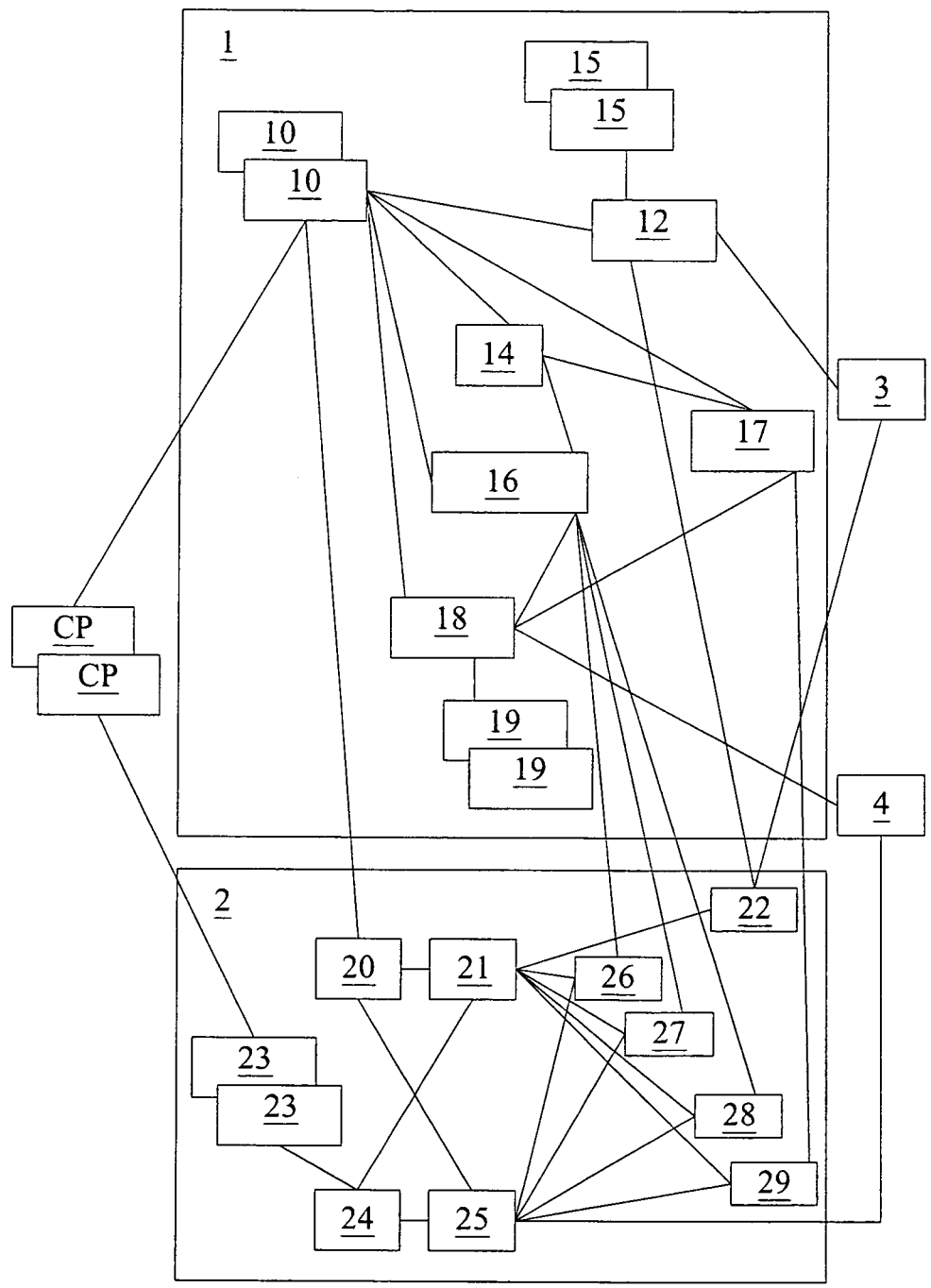
FIG. 1 illustrates a schematic diagram of the enterprise voice/data network in the invention.

A preferred embodiment of the invention is an enterprise network including one site only. Please refer to FIG. 1. FIG. 1 illustrates a schematic diagram of the enterprise voice/data network in the invention. In FIG. 1, an enterprise voice/data network 1 and an operator network 2 are shown. The enterprise voice/data network 1 includes a plurality of femtocells 10, an enterprise private branch exchange (PBX) 12, an enterprise femtocell gateway 14, a plurality of enterprise internal extension stations 15, an authorizing unit 16, an equipment authenticating unit 17, an enterprise data gateway 18, and a plurality of computers 19. The operator network 2 includes an operator femtocell gateway 20, a mobile switching center (MSC) 21, a gateway mobile switching center (GMSC) 22, a plurality of basestations (node B) 23, a radio network controller (RNC) 24, a serving GPRS support node/gateway GPRS support node (SGSN/GGSN) 25, a home location register (HLR) 26, a visitor location register (VLR) 27, an authentication center (AuC) 28, and an equipment identify register (EIR) 29. A public switched telephone network/integrated services digital network (PSTN/ISDN) 3 and an internet packet data network (PDN) 4 are coupled between the enterprise voice/data network 1 and the operator network 2.

In this embodiment, the femtocell 10 can communicate with a cell phone CP, the enterprise PBX 12, the enterprise femtocell gateway 14, the authorizing unit 16, the equipment authenticating unit 17, the enterprise data gateway 18, and the operator femtocell gateway 20 respectively. The enterprise PBX 12 can communicate with the femtocell 10, the plurality of enterprise internal extension stations 15, the GMSC 22, and a PSTN/ISDN 3 respectively. The enterprise femtocell gateway 14 can communicate with the femtocell 10, the authorizing unit 16, and the equipment authenticating unit 17 respectively. The authorizing unit 16 can communicate with the femtocell 10, the enterprise femtocell gateway 14, the enterprise data gateway 18, the HLR 26, the VLR 27, and the AuC 28 respectively. The equipment authenticating unit 17 can communicate with the femtocell 10, the enterprise femtocell gateway 14, the enterprise femtocell gateway 14, and the EIR 29 respectively. The enterprise data gateway 18 can communicate with the femtocell 10, the authorizing unit 16, the equipment authenticating unit 17, the plurality of computers 19, and the internet PDN 4 respectively. The plurality of computers 19 can communicate with the enterprise data gateway 18.

The operator femtocell gateway 20 can communicate with the femtocell 10, the MSC 21, the SGSN/GGSN 25 respectively. The MSC 21 can communicate with the operator femtocell gateway 20, the GMSC 22, the RNC 24, the HLR 26, the VLR 27, the AuC 28, and the EIR 29 respectively. The GMSC 22 can communicate with the enterprise PBX 12, the MSC 21, and the PSTN/ISDN 3 respectively. The plurality of basestations (node B) 23 can communicate with the cell phone CP and the RNC 24 respectively. The RNC 24 can communicate with the MSC 21, the plurality of basestations (node B) 23, and the SGSN/GGSN 25 respectively. The SGSN/GGSN 25 can communicate with the operator femtocell gateway 20, the RNC 24, the HLR 26, the VLR 27, the AuC 28, the EIR 29, and the internet PDN 4 respectively. The HLR 26 can communicate with the authorizing unit 16, the MSC 21, and the SGSN/GGSN 25 respectively. The VLR 27 can communicate with the authorizing unit 16, the MSC 21, and the SGSN/GGSN 25 respectively. The AuC 28 can communicate with the authorizing unit 16, the MSC 21, and the SGSN/GGSN 25 respectively. The EIR 29 can communicate with the equipment authenticating unit 17, the MSC 21, and the SGSN/GGSN 25 respectively. The PSTN/ISDN 3 can communicate with the enterprise PBX 12 and the GMSC 22 respectively. The internet PDN 4 can communicate with the enterprise data gateway 18 and the SGSN/GGSN 25 respectively. The cell phone CP can communicate with the femtocell 10 or the basestation (node B) 23.

Figure 2:
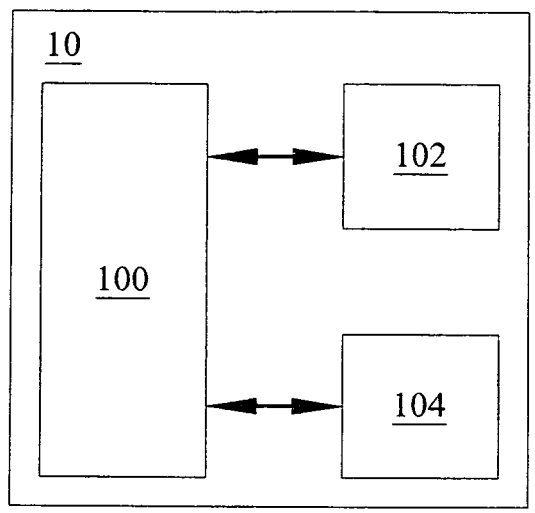
FIG. 2 illustrates a functional block diagram of the femtocell 10 shown in FIG. 1.

In this embodiment, the femtocell 10 of the enterprise voice/data network 1 functions as a VoIP gateway or a SIP server to direct voice/data signals to different destinations according to the types of the voice/data signals. The femtocell 10 will distinguish the destination of the voice/data signal and routes the voice/data signal to the destination of the voice/data signal. Please refer to FIG. 2. FIG. 2 illustrates a functional block diagram of the femtocell 10 shown in FIG. 1. As shown in FIG. 2, the femtocell 10 includes a communicating unit 100, a distinguishing unit 102, and a mapping unit 104.

In this embodiment, the femtocell 10 should support the following features:

(1) The communicating unit 100 of the femtocell 10 can use the UMTS standard, the GSM standard, or the LTE standard to communicate with the cellular terminals (e.g., the cell phone CP shown in FIG. 1), and the communicating unit 100 of the femtocell 10 can also support the layer 2 protocol stack and above, the PHY layer support, the 2G network monitor to listen to surrounding basestations, and the 3G network monitor to listen to surrounding basestations.

(2) The communicating unit 100 of the femtocell 10 can use the SIP protocol or the H.323 protocol to communicate with the VoIP gateway/gatekeeper.

(3) The distinguishing unit 102 of the femtocell 10 can distinguish calls to and from the operator network 2 or the enterprise PBX 12 of the enterprise voice/data network 1.

(4) The communicating unit 100 of the femtocell 10 can communicate with the cellular network components of the operator network 2, such as the HLR 26, the VLR 27, the AuC 28, and the EIR 29.

(5) The communicating unit 100 of the femtocell 10 can communicate with the cellular core network components of the operator network 2, such as the operator femtocell gateway 20, the MSC 21, and the SGSN/GGSN 25.

(6) The communicating unit 100 of the femtocell 10 can communicate with the enterprise PBX 12 and the enterprise data gateway 18. And, the enterprise data gateway 18 can also function as a proxy server or SGSN/GGSN.

(7) The communicating unit 100 of the femtocell 10 can route the voice/data signal to the PSTN/ISDN 3 and the internet PDN 4.

(8) The mapping unit 104 of the femtocell 10 can use a mapping method to map a unique handset/cellular terminal ID (e.g., IMEI or IMSI) to the internal extension number of the corresponding handset/cellular terminal. And, the mapping unit 104 can use a hash function or a look-up table to map, or use any other mapping methods to map.

(9) The mapping unit 104 can be disposed in each femtocell 10, the enterprise PBX 12, or the operator femtocell gateway 20.

In addition, since the femtocell 10 of the enterprise voice/data network 1 functions as a VoIP gateway or a SIP server to direct voice/data signals to different destinations according to the types of the voice/data signals, when the femtocell 10 receives calls, the femtocell 10 should follow the following routing rules:

(1) If the distinguishing unit 102 of the femtocell 10 distinguishes that the destination of the circuit switched (CS) calls originated from the enterprise handset is an enterprise internal extension, the communicating unit 100 of the femtocell 10 will route these calls to the enterprise PBX/MSC (e.g., the enterprise PBX 12 shown in FIG. 1).

(2) If the distinguishing unit 102 of the femtocell 10 distinguishes that the destination of the CS calls originated from the enterprise handset is a non-enterprise internal extension or an outside phone number, the communicating unit 100 of the femtocell 10 will route these calls to the MSC 21 of the operator network 2 through the operator femtocell gateway 20.

(3) If the distinguishing unit 102 of the femtocell 10 distinguishes that the destination of the CS calls originated from the enterprise handset is another enterprise handset, the communicating unit 100 of the femtocell 10 will route these calls to the enterprise femtocell gateway 14.

(4) If the distinguishing unit 102 of the femtocell 10 distinguishes that the destination of the CS calls originated from a non-enterprise handset is the enterprise internal extension, the communicating unit 100 of the femtocell 10 will route these calls to the enterprise PBX/MSC (e.g., the enterprise PBX 12 shown in FIG. 1).

(5) If the distinguishing unit 102 of the femtocell 10 distinguishes that the destination of the CS calls originated from the non-enterprise handset is another non-enterprise handset, the communicating unit 100 of the femtocell 10 will route these calls to the MSC 21 of the operator network 2 through the operator femtocell gateway 20.

(6) If the distinguishing unit 102 of the femtocell 10 distinguishes that the destination of the packet switched (PS) and high speed packet access (HSPA) calls originated from an enterprise data terminal is an enterprise data end point, the communicating unit 100 of the femtocell 10 will route these calls to the enterprise data gateway 18.

(7) If the distinguishing unit 102 of the femtocell 10 distinguishes that the destination of the PS and HSPA calls originated from the enterprise data terminal is a non-enterprise data end point, the communicating unit 100 of the femtocell 10 will route these calls to the enterprise data gateway 18 or the SGSN/GGSN 25 of the operator network 2.

(8) If the distinguishing unit 102 of the femtocell 10 distinguishes that the destination of the PS and HSPA calls originated from a non-enterprise data terminal is the enterprise data end point, the communicating unit 100 of the femtocell 10 will route these calls to the equipment authenticating unit 17 through the enterprise data gateway 18 for further authentication.

(9) If the distinguishing unit 102 of the femtocell 10 distinguishes that the destination of the PS and HSPA calls originated from the non-enterprise data terminal is the non-enterprise data end point, the communicating unit 100 of the femtocell 10 will route these calls to the SGSN/GGSN 25 of the operator network 2, the PSTN/ISDN 3, or the internet PDN 4.

Moreover, the handovers between any two femtocells should follow the following handover rules:

(1) The handover between two femtocells 10 of the enterprise voice/data network 1 should be allowed and controlled by the enterprise femtocell gateway 14.

(2) If there is no other femtocell for the femtocell 10 to handover to in the enterprise voice/data network 1, the handover from the femtocell 10 to the operator network 2 should be allowed.

(3) The handover from the operator network 2 to the femtocell 10 of the enterprise voice/data network 1 can be only allowed for enterprise-authorized users; for non-enterprise users, restriction may be set such that it is only allowed if the femtocell 10 of the enterprise voice/data network 1 has extra capacity to support the non-enterprise users.

In this embodiment, the communicating unit 100 receives the voice/data signal from the cell phone CP and transmits the voice/data signal to the authorizing unit 16 of the enterprise voice/data network 1 for authorization. The distinguishing unit 102 is coupled to the communicating unit 100. After the voice/data signal is authorized by the authorizing unit 16, the distinguishing unit 102 will distinguish the destination of the voice/data signal and then the communicating unit 100 will route the voice/data signal to the destination. The mapping unit 104 uses a mapping method to map between the cell phone CP and an enterprise communication ID. In fact, the enterprise communication ID can be an enterprise internal extension station or a LAN/WAN IP address, and the mapping method can be using a hash function or a look-up table, but not limited to this case.

Figure 3:
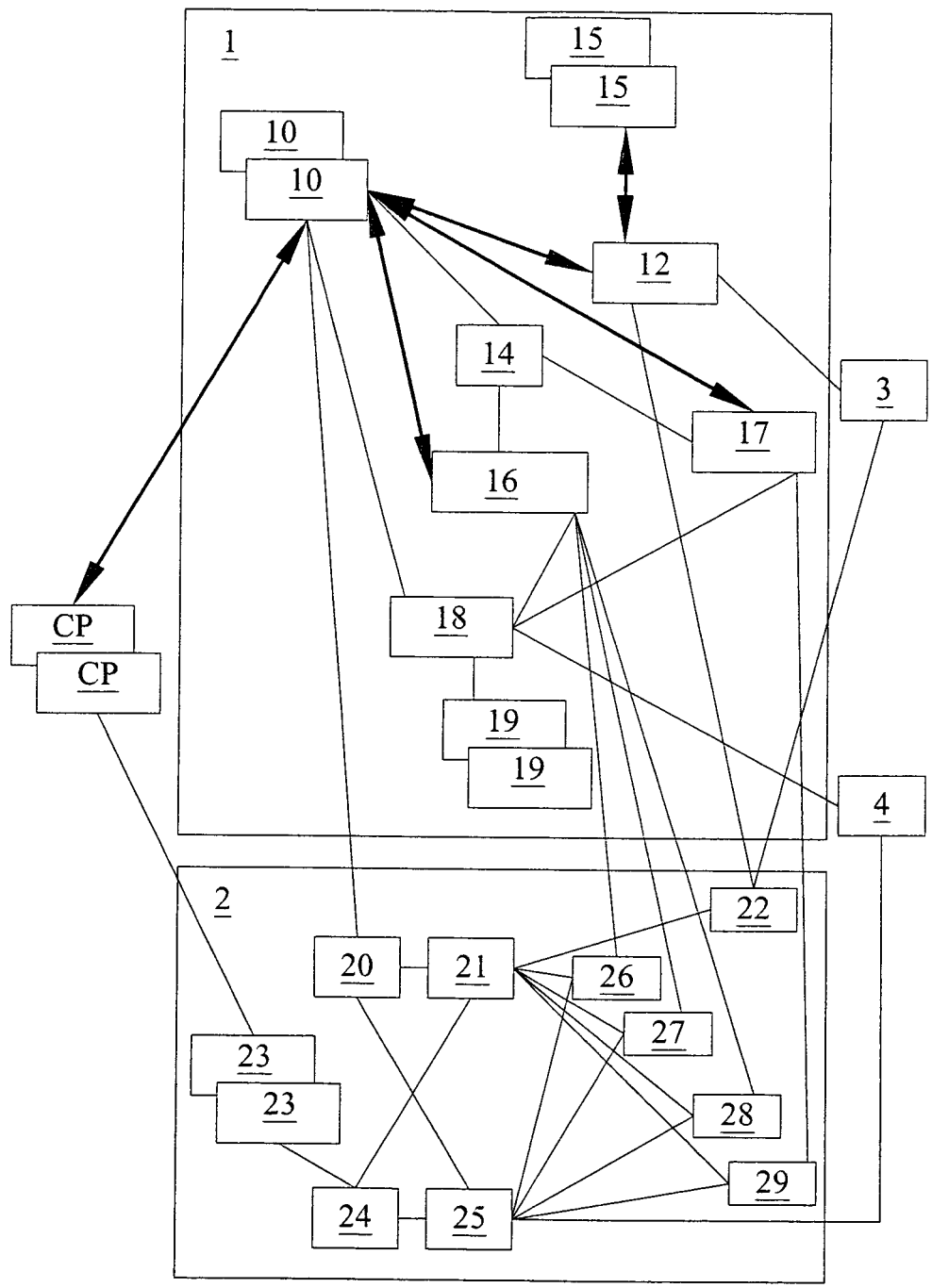
FIG. 3 illustrates a schematic diagram of the signaling/data path from an enterprise-authenticated handset to an enterprise internal extension station.

For example, FIG. 3 illustrates a schematic diagram of the signaling/data path from an enterprise-authenticated handset to an enterprise internal extension station. As shown in FIG. 3, the communicating unit 100 of the femtocell 10 receives the voice/data signal from the cell phone CP and transmits the voice/data signal to the authorizing unit 16 and the equipment authenticating unit 17 of the enterprise voice/data network 1 for user ID authorization and cell phone authentication respectively. If the cell phone CP is authenticated by the equipment authenticating unit 17 and the distinguishing unit 102 of the femtocell 10 distinguishes that the destination of the voice/data signal is the enterprise internal extension station 15 of the enterprise voice/data network 1, the communicating unit 100 of the femtocell 10 will route the voice/data signal to the enterprise internal extension station 15 through the enterprise PBX 12.

Figure 4:
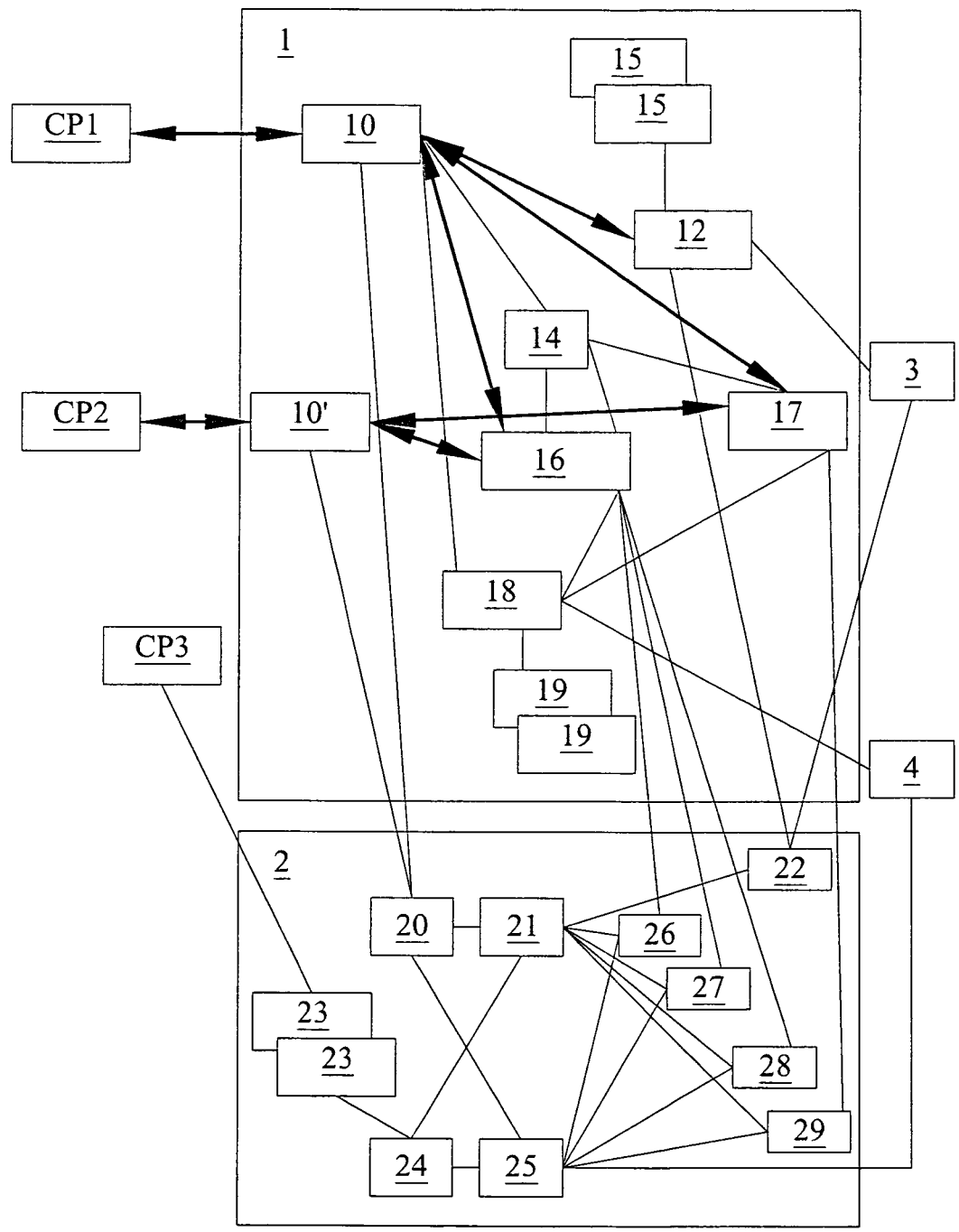
FIG. 4 illustrates a schematic diagram of the signaling/data path from an enterprise-authenticated handset to another enterprise-authenticated handset.

FIG. 4 illustrates a schematic diagram of the signaling/data path from an enterprise-authenticated handset to another enterprise-authenticated handset. As shown in FIG. 4, the communicating unit 100 of the femtocell 10 receives the voice/data signal from the cell phone CP1 and transmits the voice/data signal to the authorizing unit 16 and the equipment authenticating unit 17 of the enterprise voice/data network 1 for user ID authorization and cell phone authentication respectively. If the cell phone CP1 is authenticated by the equipment authenticating unit 17 and the distinguishing unit 102 distinguishes that the destination of the voice/data signal is another cell phone CP2, the communicating unit 100 of the femtocell 10 will route the voice/data signal to the cell phone CP2 through the enterprise PBX 12 and another femtocell 10' corresponding to the cell phone CP2.

Figure 5:
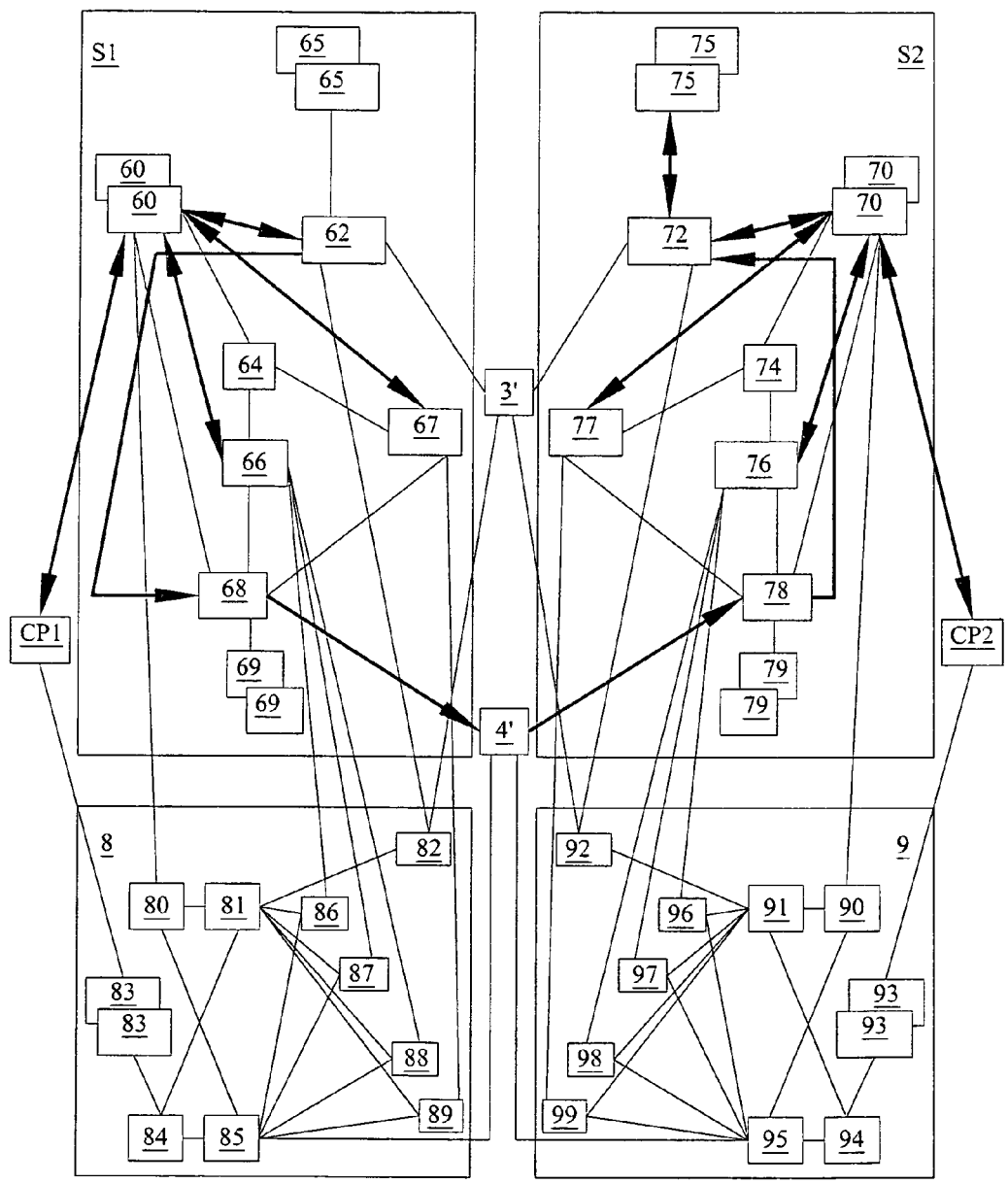
FIG. 5 illustrates a schematic diagram of the signaling/data path from the first site to the second site.

FIG. 1, FIG, 3, and FIG. 4 discussed above all show the enterprise voice/data network having only one site. In fact, the enterprise voice/data network of the invention can have two or more sites, and these sites can be connected by PSTN, ISDN, internet, or PDN. Please refer to FIG. 5. FIG. 5 illustrates a schematic diagram of the signaling/data path from a first site to a second site of an enterprise voice/data network.

In FIG. 5, a first site S1 and a second site S2 of an enterprise voice/data network 6 are shown. And, FIG. 5 also shows a first operator network 8 and a second operator network 9. In fact, the first operator network 8 and the second operator network 9 can be the same operator network or different operator networks. And, a public switched telephone network/integrated services digital network (PSTN/ISDN) 3' and an internet packet data network (PDN) 4' are coupled between the first site S1 and the second site S2 of the enterprise voice/data network 6. In fact, the first site S1 can communicate with the second site S2 through the PSTN/ISDN 3', the PDN 4', or any private wired or wireless communication link such as fiber, E1, T1, etc.

In practical applications, the first site S1 and the second site S2 of the enterprise voice/data network 6 can be disposed at different locations. For example, the first site S1 may be disposed in office A of Taiwan and the second site S2 may be disposed in office B of Japan, and the first site S1 can communicate with the second site S2 through the PSTN/ISDN 3' and the internet PDN 4'.

As shown in FIG. 5, the first site S1 includes a plurality of femtocells 60, an enterprise private branch exchange (PBX) 62, an enterprise femtocell gateway 64, a plurality of enterprise internal extension stations 65, an authorizing unit 66, an equipment authenticating unit 67, an enterprise data gateway 68, and a plurality of computers 69. Similarly, the second site S2 includes a plurality of femtocells 70, an enterprise PBX 72, an enterprise femtocell gateway 74, a plurality of enterprise internal extension stations 75, an authorizing unit 76, an equipment authenticating unit 77, an enterprise data gateway 78, and a plurality of computers 79.

The first operator network 8 includes an operator femtocell gateway 80, a mobile switching center (MSC) 81, a gateway mobile switching center (GMSC) 82, a plurality of basestations (node B) 83, a radio network controller (RNC) 84, a serving GPRS support node/gateway GPRS support node (SGSN/GGSN) 85, a home location register (HLR) 86, a visitor location register (VLR) 87, an authentication center (AuC) 88, and an equipment identify register (EIR) 89. Similarly, the second operator network 9 includes an operator femtocell gateway 90, a MSC 91, a GMSC 92, a plurality of basestations (node B) 93, a RNC 94, a SGSN/GGSN 95, a HLR 96, a VLR 97, an AuC 98, and an EIR 99.

When the femtocell 60 of the first site S1 receives a voice/data signal from a cell phone CP1 and transmits the voice/data signal to the authorizing unit 66 and the equipment authenticating unit 67 of the first site S1 for user ID authorization and cell phone authentication respectively. If the cell phone CP1 is authenticated by the equipment authenticating unit 67 and the femtocell 60 distinguishes that the destination of the voice/data signal is the enterprise internal extension station 75 of the second site S2, the femtocell 60 will route the voice/data signal to the enterprise data gateway 68 through the enterprise PBX 62. And then, the enterprise data gateway 68 of the first site S1 will route the voice/data signal to the enterprise data gateway 78 of the second site S2 through the Internet PDN 4'. When the enterprise data gateway 78 of the second site S2 receives the voice/data signal from the internet PDN 4', the enterprise data gateway 78 will route the voice/data signal to the enterprise internal extension station 75 through the enterprise PBX 72 of the second site S2.

On the other hand, if the femtocell 60 distinguishes that the destination of the voice/data signal is another cell phone CP2 corresponding to the second site S2, the femtocell 60 will route the voice/data signal to the enterprise data gateway 68 through the enterprise PBX 62. And then, the enterprise data gateway 68 of the first site S1 will route the voice/data signal to the enterprise data gateway 78 of the second site S2 through the internet PDN 4'. When the enterprise data gateway 78 of the second site S2 receives the voice/data signal from the internet PDN 4', if the cell phone CP2 is authenticated by the equipment authenticating unit 77, the enterprise data gateway 78 will route the voice/data signal to the cell phone CP2 through the enterprise PBX 72 and the femtocell 70 corresponding to the cell phone CP2.

Therefore, a phone call from the cell phone of an enterprise-authorized user in office A of Taiwan can be answered by the cell phone of another enterprise-authorized user or the wired desk phone in office B of Japan through the enterprise network including femtocells disclosed by the invention.

It should be emphasized that the integration of the femtocell to the enterprise network in the invention can be also done to more than 2 sites. For example, the enterprise voice/data network can include three sites disposed at different locations, and the femtocells of the invention can be applied in each of the three sites, but not limited to this case.

Compared to the prior art, the invention discloses an enterprise network and a femtocell designed for the enterprise network to outline innovative ways to integrate femtocell with the latest PBX technologies such as H.323, SIP, or other data/voice communication protocols. It provides a solution for the enterprise to keep the ownership of the secure information (e.g., authentication, subscriber information) and the operator to provide an enterprise level solution through the use of femtocells. Therefore, 3G operators can use the technologies of the invention to infiltrate the enterprise market more easily.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An enterprise network, comprising:
   a first site, comprising:
      an authorizing unit;
      an enterprise private branch exchange (PBX); and
      a plurality of femtocells, coupled to the authorizing unit and the enterprise PBX; and
   a second site;
   wherein after a first femtocell of the plurality of femtocells receives a voice/data signal from a first enterprise-authenticated handset and the authorizing unit authorizes the voice/data signal, the first femtocell distinguishes a destination of the voice/data signal and routes the voice/data signal to the destination, the first site communicates with the second site through an internet/a public data network (PDN), the first site further comprises an enterprise data gateway coupled to the enterprise PBX, if the destination of the voice/data signal is the second site, the first femtocell will route the voice/data signal to the second site through the enterprise PBX, the enterprise data gateway, and the internet/PDN.

2. The enterprise network of claim 1, wherein the second site comprises:
- an enterprise private branch exchange (PBX); and
- an enterprise data gateway, coupled between the internet/PDN and the enterprise PBX of the second site, when the enterprise data gateway of the second site receives the voice/data signal from the internet/PDN, the enterprise data gateway of the second site routes the voice/data signal to the enterprise PBX of the second site.

3. The enterprise network of claim 2, wherein if the destination of the voice/data signal is an enterprise internal extension station of the second site, the enterprise PBX of the second site will route the voice/data signal to the enterprise internal extension station of the second site.

4. A femtocell applied in a site of an enterprise network, the site comprising an authorizing unit and an enterprise private branch exchange (PBX), the femtocell comprising:
- a communicating unit, coupled to the authorizing unit, the communicating unit receiving a voice/data signal from a first enterprise-authenticated handset and transmitting the voice/data signal to the authorizing unit for authorization; and
- a distinguishing unit, coupled to the communicating unit, after the voice/data signal is authorized by the authorizing unit, the distinguishing unit distinguishing a destination of the voice/data signal and the communicating unit routing the voice/data signal to the destination,
- wherein the enterprise network further comprises a second site, and the first site communicates with the second site through an internet/PDN, the first site further comprises an enterprise data gateway coupled to the enterprise PBX, if the destination of the voice/data signal distinguished by the distinguishing unit is the second site, the communicating unit of the femtocell will route the voice/data signal to the second site through the enterprise PBX, the enterprise data gateway, and the internet/PDN.

* * * * *